US008491275B2

(12) United States Patent
Lolli et al.

(10) Patent No.: US 8,491,275 B2
(45) Date of Patent: Jul. 23, 2013

(54) KIT, EQUIPPED WITH A CONTROL DEVICE, FOR REPAIRING AND INFLATING INFLATABLE ARTICLES, AND RELATIVE CANISTER ASSEMBLY

(75) Inventors: Sergio Lolli, Pesaro (IT); Maurizio Marini, Pesaro (IT)

(73) Assignee: Tek Global S.R.L., Pesaro (IT)

( * ) Notice: Subject to any disclaimer, the term of this patent is extended or adjusted under 35 U.S.C. 154(b) by 475 days.

(21) Appl. No.: 12/672,412

(22) PCT Filed: Aug. 8, 2008

(86) PCT No.: PCT/IB2008/002091
§ 371 (c)(1),
(2), (4) Date: Feb. 4, 2011

(87) PCT Pub. No.: WO2009/019590
PCT Pub. Date: Feb. 12, 2009

(65) Prior Publication Data
US 2011/0116941 A1 May 19, 2011

(30) Foreign Application Priority Data
Aug. 8, 2007 (IT) .............................. TO2007A0591

(51) Int. Cl.
*B65B 1/04* (2006.01)
*B29C 73/16* (2006.01)
*F04B 39/00* (2006.01)

(52) U.S. Cl.
USPC .............................. 417/313; 141/38; 152/415

(58) Field of Classification Search
USPC ................. 417/313; 141/38; 152/415; 222/3, 222/53; 137/223
See application file for complete search history.

(56) References Cited

U.S. PATENT DOCUMENTS

2008/0060734 A1* 3/2008 Stehle .......................... 152/416
2009/0266440 A1* 10/2009 Lolli et al. ...................... 141/38

FOREIGN PATENT DOCUMENTS

EP        1 747 878        1/2007
WO       2005/084968       9/2005

* cited by examiner

*Primary Examiner* — Charles Freay
*Assistant Examiner* — Philip Stimpert
(74) *Attorney, Agent, or Firm* — Ladas & Parry LLP

(57) ABSTRACT

A kit for repairing and inflating inflatable articles has a compressor assembly; a canister assembly containing sealing fluid; and releasable connecting means defining an assembly direction and for connecting the compressor assembly to the canister assembly. The kit has a control device for controlling turn-on of the compressor assembly, and at least one movable electric terminal connected to the control device and loaded elastically into a predetermined position; and the canister assembly has a sensor, and at least one electric contact connected to the sensor and cooperating with the movable electric terminal to transmit a signal from the sensor to the control device when the canister assembly is connected to an inflatable article; the movable electric terminal being designed to exert force on the canister assembly to move the canister assembly in the assembly direction when the releasable connecting means are released.

12 Claims, 5 Drawing Sheets

KIT, EQUIPPED WITH A CONTROL DEVICE, FOR REPAIRING AND INFLATING INFLATABLE ARTICLES, AND RELATIVE CANISTER ASSEMBLY

TECHNICAL FIELD

The present invention relates to a kit for repairing and inflating inflatable articles, particularly tyres, and to the relative canister assembly.

BACKGROUND ART

Kits are known comprising an outer casing; a compressor assembly housed inside the outer casing; and a sealing fluid canister assembly connected releasably to the compressor assembly to inject sealing fluid into the tyre. The empty used canister assembly is replaced with a new one purchased by the user and reconnected to the compressor assembly.

When using the kit, the user may inadvertently activate the compressor assembly before connecting the canister assembly to the tyre, thus wasting sealing fluid and resulting in agitation of the user. Moreover, as the user is rarely experienced in performing complex, time-consuming technical operations in tyre-repair situations, a need is also felt for a kit that is extremely simple to use.

DISCLOSURE OF INVENTION

It is an object of the present invention to provide a kit for repairing and inflating inflatable articles, designed to eliminate the above drawback.

According to the present invention, there are provided a kit for repairing and inflating inflatable articles, as claimed in claim 1, and a canister assembly as claimed in claim 7.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
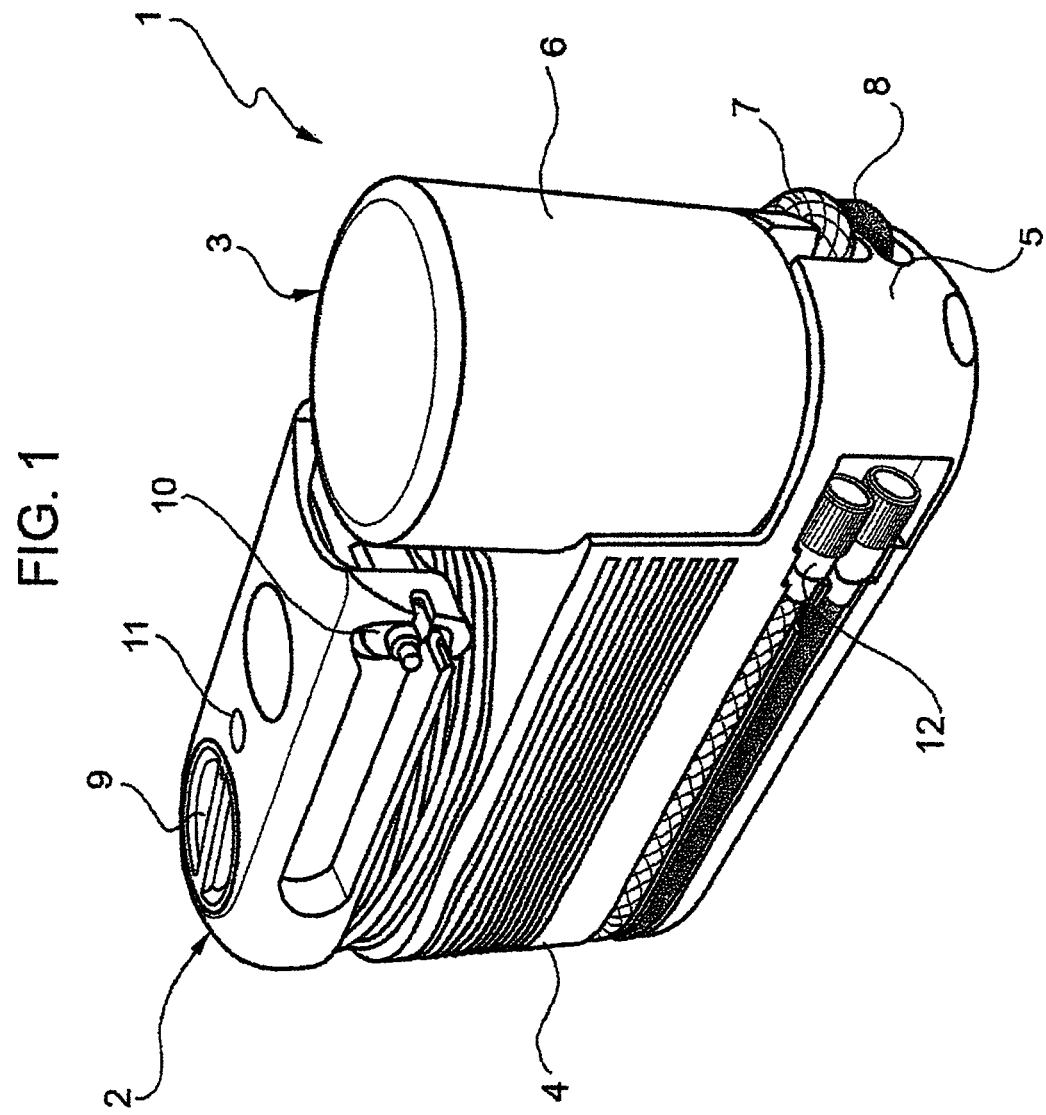
FIG. 1 shows a view in perspective of a kit in accordance with the present invention.

Number 1 in FIG. 1 indicates as a whole a kit for repairing and inflating inflatable articles, and comprising an outer casing 2; a compressor assembly C (shown schematically in FIG. 2) housed inside outer casing 2; and a canister assembly 3 connected releasably to compressor assembly C.

More specifically, outer casing 2 comprises a substantially parallelepiped-shaped portion 4 housing compressor assembly C; and a projecting portion projecting from the end of portion 4 to define a seat at least partly housing canister assembly 3.

Canister assembly 3 contains sealing fluid for repairing a flat tyre, and comprises a bottle 6 positioned upside down in use; and a hose 7 connected to bottle 6 to feed sealing fluid into the tyre.

Kit 1 also comprises a second hose 8 connected directly to compressor assembly C to inflate the tyre without injecting sealing fluid; and control means for selecting a repair mode in which hose 7 and bottle 6 are connected to compressor assembly C, and an inflation mode in which hose 8 is connected to compressor assembly C. For example, the control means comprise a valve switchable by a knob 9 on casing 2, and having two outlets connected to canister assembly 3 and hose 8 respectively.

Kit 1 also comprises an electronic control device 50 (FIG. 2) for turning compressor C of kit 1 on and off, in particular by means of a safety device. More specifically, the electronic device comprises: a first and second power input IN AL 1, 2 connected, in use, to a power plug 10, and in particular connected respectively to a power line at a supply voltage, for example, of 12 V, and to a ground line; a first and second control input IN 1, 2 connected to a main switch 11 of electronic control device 50; a third and fourth control input IN 3, 4 connected to a safety device of kit 1; a fifth and sixth control input IN 5, 6 connected to a selector in turn connected functionally to knob 9; and a first and second output connected to compressor assembly C of kit 1, and in particular to respective first and second power inputs.

In a preferred embodiment, the safety device of kit 1 is electrical, and is fitted to a connecting device 12 connected to hose 7 and for connecting hose 7 releasably to the safety valve of the tyre.

By way of example, the safety device comprises a contact sensor 51 which acts as a switch and preferably comprises a movable member held in an open-switch position by an elastic member (not shown), and a first and second electric conductor 13, 14 (FIG. 3) connected to the terminals of contact sensor 51, preferably inside connecting device 12 (and to the third and fourth control input IN 3, 4 of electronic control device 50), and located along, e.g. inside, hose 7.

The electronic device also comprises:

a DC/DC converting stage (not shown) connected to the first power input and supplying at a relative output an internal supply voltage, e.g. of 5 V, to operate electronic control device 50;

a turn-on stage 52 comprising: a turn-on switch 53, in particular an N-channel power MOS transistor, having current-conducting terminals connected respectively to the second output of the electronic device (the first output being connected to the power line) and to the ground line; and a first control unit 54 input-connected to the first and second control input IN 1, 2, and output-connected to a control terminal of turn-on switch 53;

an enabling stage 55 comprising: an enabling switch 56, in particular an NPN bipolar transistor, having current-conducting terminals connected respectively to the control terminal of turn-on switch 53 and to ground; and a second control unit 57 input-connected to the third, fourth, fifth and sixth control input IN 3, 4, 5, 6, and output-connected to a control terminal of enabling switch 56.

Figure 3:
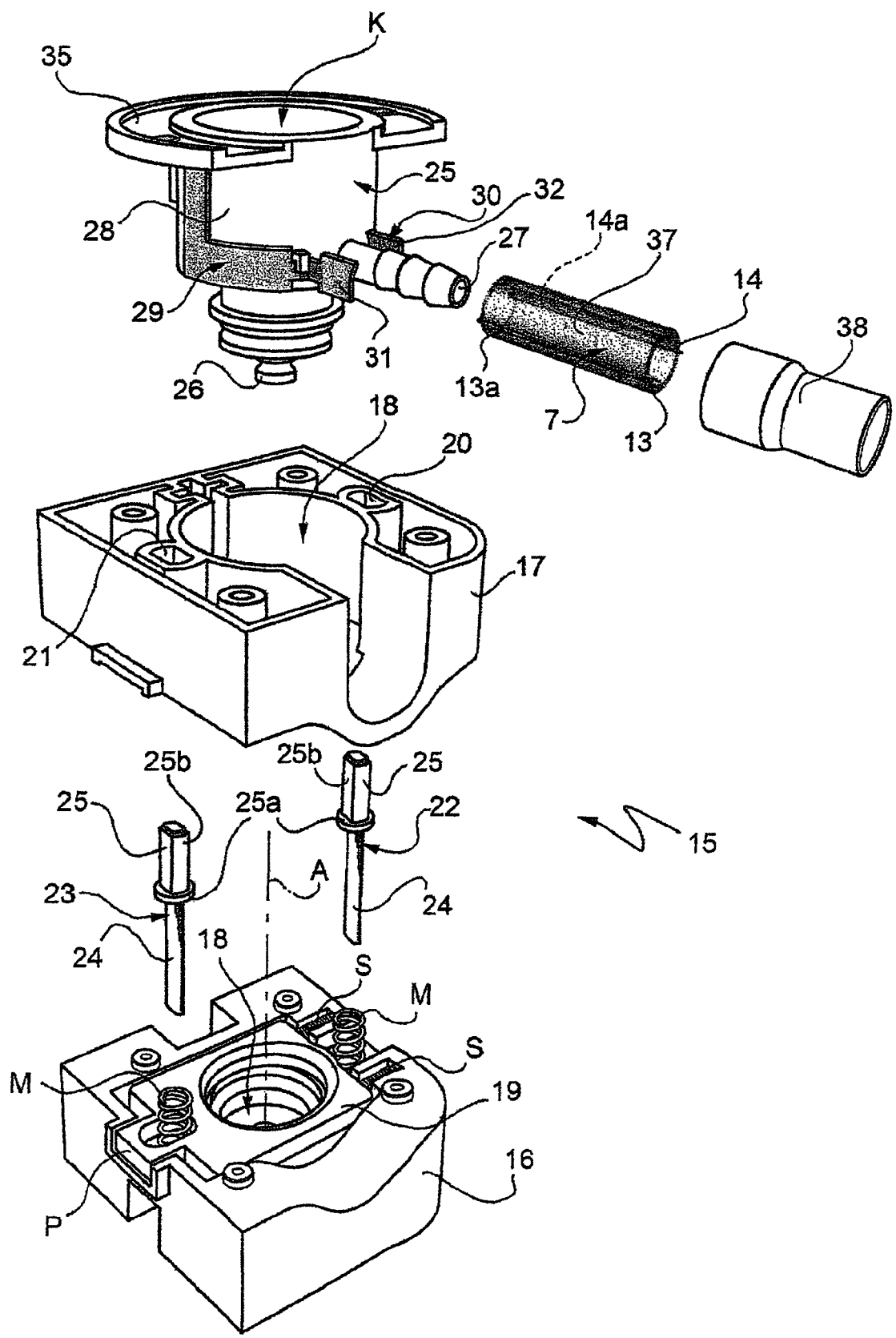
FIG. 3 shows an exploded view in perspective of part of the FIG. 1 kit.

FIG. 3 shows a releasable connecting device 15 mounted inside projecting portion 5 of casing 2 to connect compressor assembly C to canister assembly 3, and which comprises a base 16 connected rigidly to projecting portion 5; and a guide member 17 mounted on base 16 to form a single module by which to connect bottle 6 fluidically to compressor assembly C, and canister assembly 3 mechanically to casing 2. Base 16 and guide device 17 form a compact parallelepiped, and define a cavity 18 which is open on the side facing canister assembly 3, extends along an axis A, and is connected fluidically to compressor assembly C and to the valve switched by knob 9 by a conduit defined at least partly by base 16.

A lock member 19 is mounted between base 16 and guide member 17, is movable crosswise to axis A, and is loaded by elastic means S into a position engaging canister assembly 3 inside cavity 18 to prevent movement of canister assembly 3 along axis A (position shown in FIG. 3).

Base 16 and guide member 17 define two through holes 20, 21 housing in sliding manner respective ejector devices 22, 23 by which to expel canister assembly 3 when the user presses lock member 19, in opposition to elastic means S, by means of a push-button P.

Each ejector device comprises a straight rod 24 parallel to axis A; a supporting insert 25 connected rigidly to rod 24; and a spring M fitted to base 16 to hold supporting insert 25 in a predetermined position. More specifically, the supporting insert comprises a flange 25a resting against guide member 17 to define the predetermined position; and a portion 25b having a non-circular cross section negatively reproduced by the relative hole 20, 21 to prevent rotation of rod 24.

Rods 24 are of such a length as to project, parallel to axis A, with respect to guide member 17 when canister assembly 3 is not connected to releasable connecting device 15.

In a preferred embodiment, rods 24 are made of conducting material, are of such a length as to project from respective holes 20, 21 on the opposite side of guide member 17 to canister assembly 3, and are connected to two terminals of the electronic device of kit 1.

For connection to base 16 and guide member 17, releasable connecting device 15 cooperates with a connecting member 25 of canister assembly 3 (FIGS. 3, 4) connected rigidly to bottle 6 and cooperating inside cavity 18 with lock member 19 to lock canister assembly to base 16, and with guide member 17 to prevent movement in a plane perpendicular to axis A.

More specifically, connecting member 25 is designed to connect to base 16 in a one-way movement—in the example shown, in a direction parallel to axis A.

Connecting member 25 defines an inlet 26 connected fluidically to compressor assembly C by the conduit defined by base 16; and an outlet 27 connected to hose 7. More specifically, inlet 26 is connected to outlet 27 via the inside of bottle 6 to define a predetermined flow path for the compressed air generated by compressor assembly C when injecting sealing fluid into the tyre. The predetermined flow path conveniently extends through a valve (not shown) housed inside bottle 6 to open outlet 27 and control the pressure of bottle 6 and outflow of the sealing fluid along hose 7. For example, the valve is as described in International Patent Application WO-A-2005084968 filed by the present Applicant.

Preferably, inlet 26 is coaxial with axis A, and is carried by a tubular body 28 approximating but no larger than a portion of cavity 18 defined by guide member 17, so as to secure canister assembly 3 in directions perpendicular to axis A. More specifically, tubular body 28 defines a cavity K housing the neck (not shown) of bottle 6.

Outlet 27 is crosswise to axis A, and is defined by a tubular member having an inverted-pine-shaped outer profile for connection to hose 7 made of polymer material.

Connecting member 25 supports two conductors 29, 30 preferably defined by contoured metal strips and comprising respective end portions 31, 32 alongside outlet 17. Each conductor 29, 30 also comprises a second end portion 33 (only one shown in FIG. 4) fitted to a wall 35 projecting, crosswise to axis A, from tubular body 28, so that end portions 33 cooperate with rods 24 and connect contact sensor 51 to electronic device 50 when canister assembly 3 is connected to connecting device 15.

Figure 4:
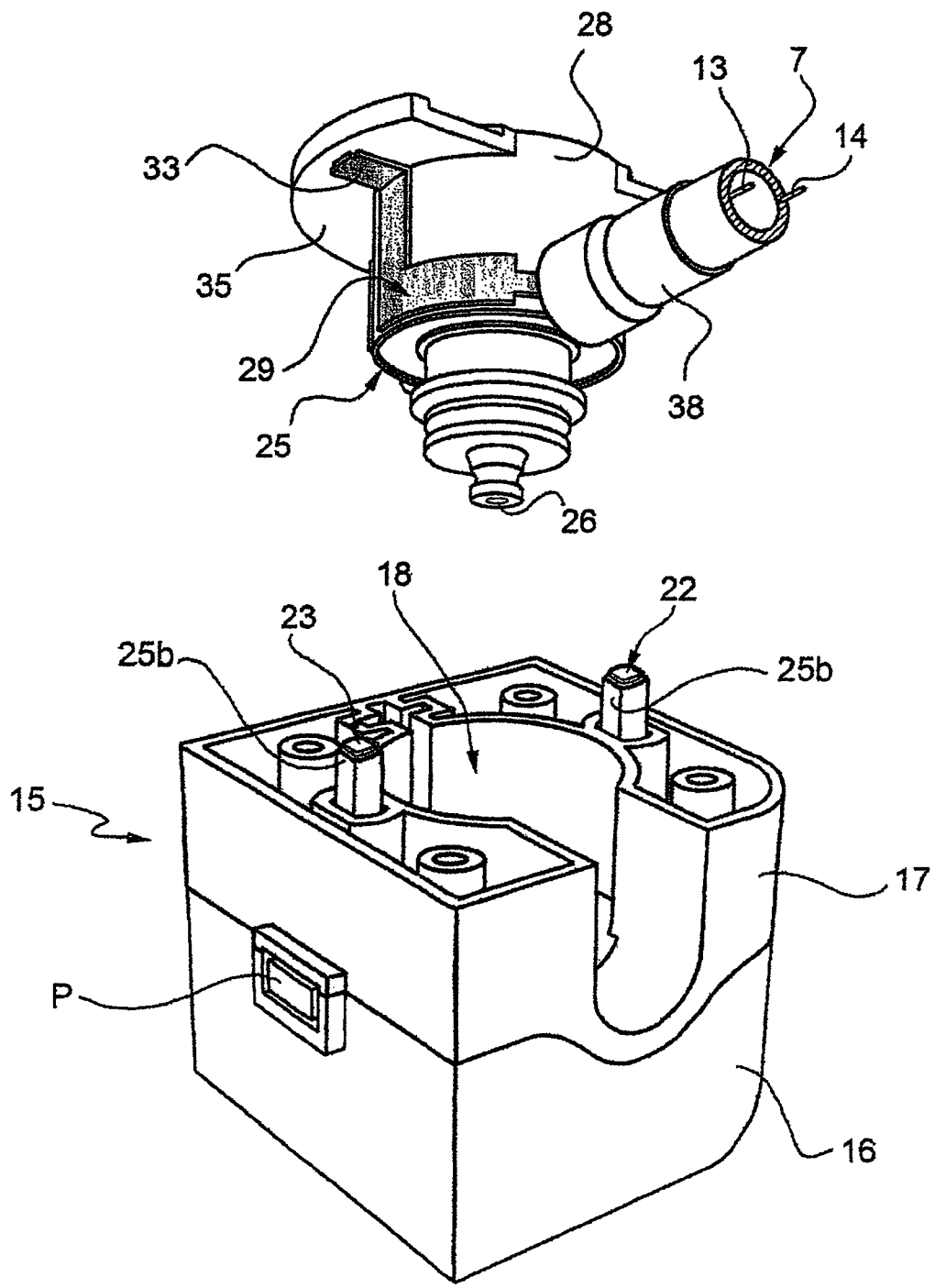
FIGS. 4 and 5 show views in perspective of part of the FIG. 1 kit disassembled and assembled respectively.
Figure 5:
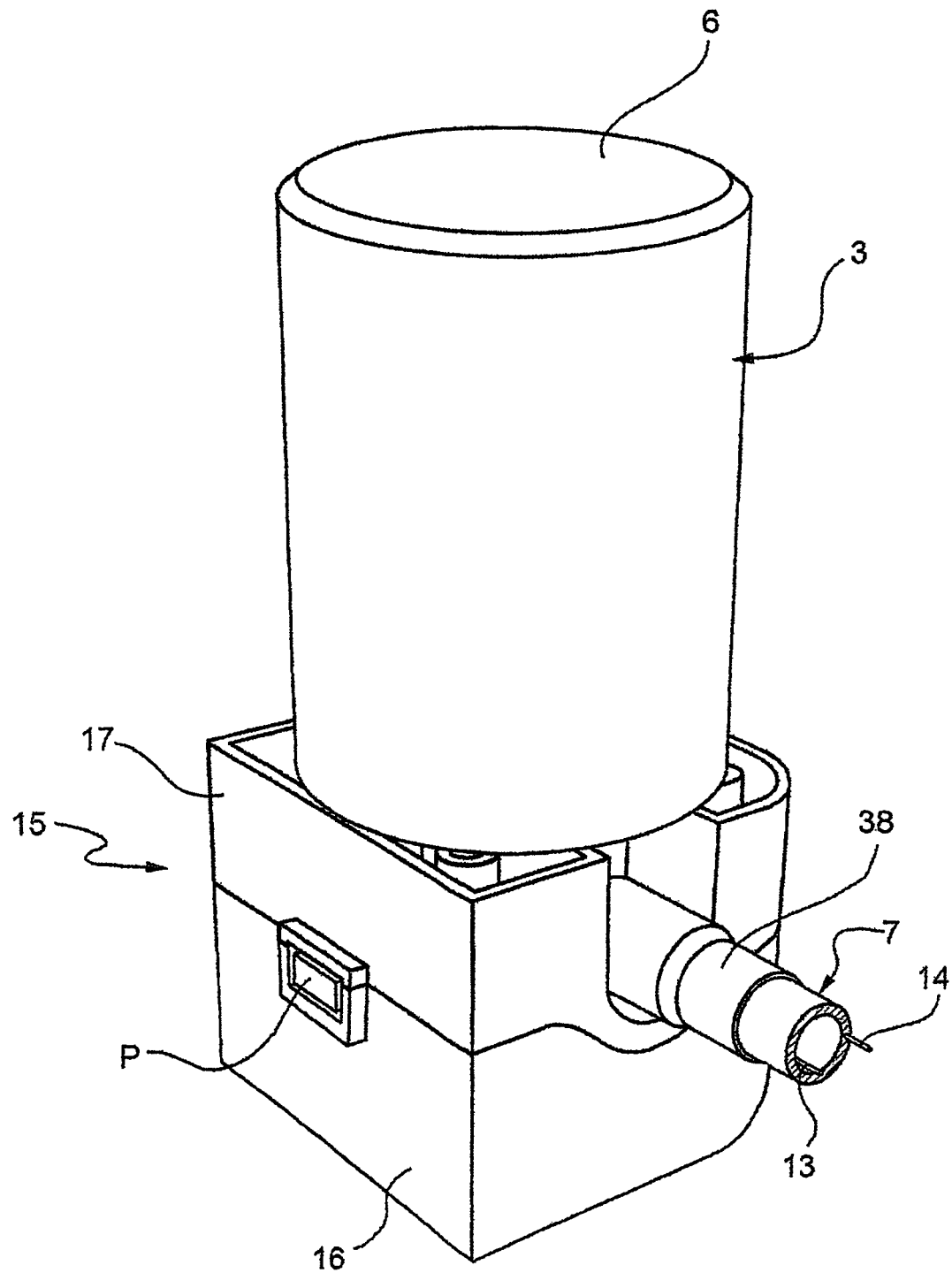

More specifically, contact sensor 51 is connected to conductors 29, 30 by conductors 13, 14 defined, for example, by metal wires fitted inside hose 7 and having respective end portions 13a, 14a bent outwards at an end portion 37 of the hose, as shown in FIG. 4. Hose 7 is thus secured by radial interference to the tubular portion defining outlet 27, conductors 13 and 14 being interposed radially between end portion 37 and the tubular portion defining outlet 27. Preferably, end portions 31, 32 project from tubular body 28, and are flexible to apply sufficient pressure to ensure reliable electrical contact between end portions 13a, 14a and conductors 29, 30.

End portions 31, 32 are covered and protected by a sleeve 38 preferably made of heat-shrink polymer material.

In actual use, when knob 9 is set to repair mode, the electronic control device determines the chosen mode and only enables compressor assembly C when rods 24 are short-circuited by contact sensor 51, which only closes when hose 7 is connected properly to the safety valve of the tyre.

More specifically, when the, for example threaded, connecting device 12 is screwed to the safety valve, the movable member comes to rest against the valve and withdraws to short-circuit conductors 13, 14.

When knob 9 is set to inflation mode, the electronic control device determines the chosen mode and disables contact sensor 51, so that compressor assembly C is activated when main switch 11 is closed, and is deactivated when main switch 11 is opened.

Preferably, main switch 11 is movable between an open position and a closed position, and is designed to return automatically to the open position when pressed by the user, so that accidental pressure, before power plug 10 is connected to the current outlet, does not maintain the closed position. On the contrary, the open position is immediately restored, so that compressor assembly C is only activated by the user pressing main switch 11 after connecting power plug 10 to the current outlet. This therefore prevents compressor assembly C from being activated while connecting power plug 10 to the current outlet. Main switch 11, for example, is electronic.

More specifically, operation as described above is ensured by cooperation between turn-on stage 52 and enabling stage 55 of electronic control device 50.

Figure 2:
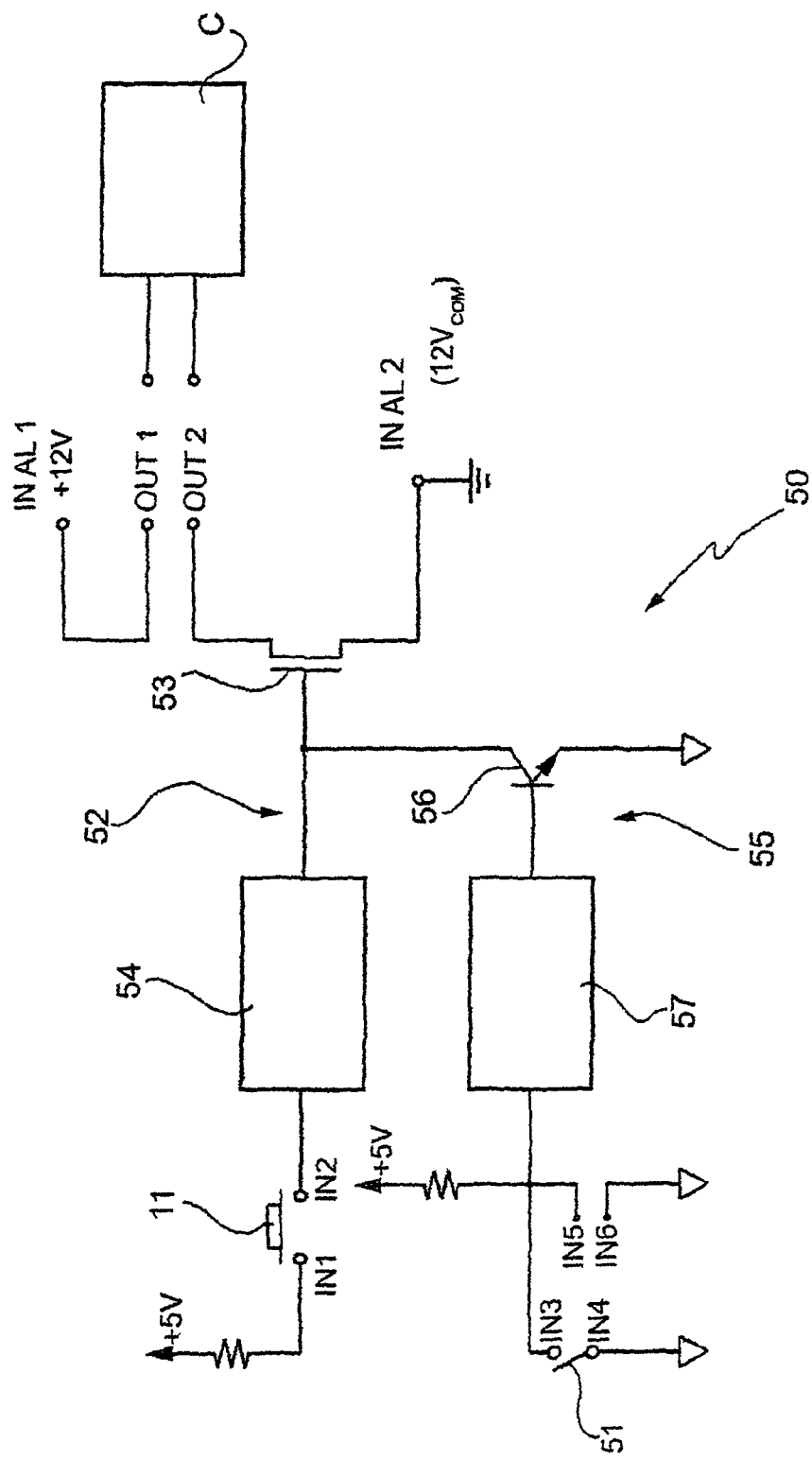
FIG. 2 shows a circuit diagram of an electronic control device of the compressor assembly of the FIG. 1 kit.

With reference to FIG. 2, only when enabling switch 56 is open is turn-on stage 52 enabled to turn compressor assembly C on or off in response to user operation of main switch 11. More specifically, first control unit 54 is equipped internally with a logic memory element (e.g. a flip-flop), and is configured (in a manner not described in detail but obvious to an expert) to switch the high/low value of a control signal supplied to the control terminal of turn-on switch 53 whenever main switch 11 is pressed by the user. If the control signal is of such a value, e.g. high, as to close turn-on switch 53, compressor assembly C is activated (by virtue of the closed turn-on switch connecting the second output electrically to the ground line).

More specifically, enabling switch 53 (normally closed to disable the compressor assembly) is opened by enabling stage 55, thus enabling turn-on stage 52, both in response to closure of the knob 9 selector (indicating inflation mode selection by the user), and in response to closure of contact sensor 51, but only if the knob 9 selector is open (indicating repair mode selection by the user). One point to note in connection with the above is the way in which, given the circuit arrangement shown in FIG. 2, closure of the selector actually disables contact sensor 51, and contact sensor 51 only intervenes in the electronic control device when the selector is open.

Electric contact between canister assembly 3 and the electronic device is ensured by the ends of rods 24 contacting relative conductors 29, 30, and is improved by the force exerted by springs M which are movable to take up any slack.

Moreover, when button P of lock member 19 is pressed by the user, springs M assist expulsion, and so simplify replacement, of canister assembly 3.

The advantages of kit 1 as described above are as follows.

Contact sensor 51 connected to contacts 33 supplies a signal to only turn on compressor assembly C when hose 7 is connected to the tyre and knob 9 is set to repair mode.

Spring-loaded rods 24, movable in the assembly direction of canister assembly 3, ensure reliable electric contact by means of springs M, and also act as an ejector device to expel canister assembly 3 when button P is pressed.

Electric contacts 33 are fitted to wall 35 to cooperate easily and effectively with, i.e. the ends of, rods 24.

Clearly, changes may be made to kit 1 as described and illustrated herein without, however, departing from the scope of the present invention as defined in the accompanying Claims.

In particular, conductors 29, 30 may be molded on, so that at least end portions 31, 32, 33 are exposed for electric connection to conductors 13, 14 and rods 24.

Base 16 may comprise a non-return valve by which to disconnect cavity 18 from compressor assembly C when canister assembly 3 is removed from base 16, and which is preferably controlled to open automatically when canister assembly 3 is fitted to base 16.

The electronic circuit described and illustrated may be fitted to a kit comprising releasable connecting means and/or a canister assembly with a safety device for short-circuiting conductors 29, 30 other than those illustrated.

The invention claimed is:

1. A kit for repairing and inflating an inflatable article, comprising a compressor assembly (C); a canister assembly (3) containing sealing fluid; and releasable connecting means (16, 17) defining an assembly direction (A) and for connecting said compressor assembly (C) to said canister assembly (3); wherein the kit comprises a control device for controlling turn-on of said compressor assembly (C), and at least one movable electric terminal (24) connected to said control device and loaded elastically into a predetermined position; and in that said canister assembly (3) comprises a sensor (51), and at least one electric contact (33) connected to said sensor (51) and cooperating with said movable electric terminal (24) to transmit a signal from said sensor (51) to said control device when said canister assembly (3) is connected to said inflatable article; said movable electric terminal (24) being designed to exert force on said canister assembly (3) to move said canister assembly (3) in said assembly direction (A) when said releasable connecting means (16, 17) are released.

2. A kit as claimed in claim 1, wherein said at least one movable terminal (24) is movable parallel to said assembly direction (A); and said at least one electric contact (33) is fitted to a wall (35) crosswise to said assembly direction (A).

3. A kit as claimed in claim 1, further comprising a casing (2), and in that said releasable connecting means (16, 17) comprise a module (26, 27) connected rigidly to said casing (2) and defining a cavity (18) connected fluidically to said compressor assembly (C), and at least one seat (20; 21) for said movable electric terminal (24).

4. A kit as claimed in claim 1, wherein said canister assembly (3) comprises a pipe (7) supplying said sealing fluid and supporting said sensor (51); a connecting unit (25) by which to engage said releasable connecting means (16, 17); at least one first electric conductor (13; 14) carried by said pipe (7) and connected to said sensor (51); and at least one second electric conductor (29; 30) having a first portion (33) defining the electric contact cooperating with said movable electric terminal (24) when said canister assembly (3) is fixed to said releasable connecting means (16, 17); said second electric conductor (29; 30) comprising a second portion (31; 32) connected electrically to an end portion (13a; 14a) of said first electric conductor (13; 14).

5. A kit as claimed in claim 4, wherein said first portion (33) and said second portion (31; 32) are spaced apart in said assembly direction (A).

6. A kit as claimed in claim 4, wherein said second portion (31; 32) is located alongside said pipe (7).

7. A canister assembly, for sealing fluid, connectable to a compressor assembly (C) and comprising a connecting unit (25) defining an assembly direction (A) and cooperating with releasable connecting means (16, 17) connected to said compressor assembly (C); the canister assembly comprising a sensor (51); and at least one electric contact (33) connected to said sensor (51) and cooperating with a movable electric terminal (24) to transmit a signal from said sensor (51) to a control device when said canister assembly (3) is connected to an inflatable article; said electric contact (33) being so located with respect to said assembly direction (A) as to be contacted by said movable electric terminal (24) to transmit an elastic force to said canister assembly (3) to move said canister assembly (3) in said assembly direction (A) when said releasable connecting means (16, 17) are released.

8. A canister assembly as claimed in claim 7, wherein said electric contact (33) is fitted to a wall (35) crosswise to said assembly direction.

9. A canister assembly as claimed in claim 7, further comprising a pipe (7) supplying said sealing fluid and supporting said sensor (51); at least one first electric conductor (13; 14) carried by said pipe (7) and connected to said sensor (51); and at least one second electric conductor (29; 30) having a first portion (33) defining the electric contact and cooperating with said movable electric terminal (24) when said canister assembly (3) is fixed to said releasable connecting means (16, 17); said second electric conductor (29; 30) comprising a second portion (31; 32) connected electrically to an end portion (13a; 14a) of said first electric conductor (13; 14).

10. A canister assembly as claimed in claim 9, wherein said first portion (33) and said second portion (31; 32) are spaced apart in said assembly direction (A).

11. A canister assembly as claimed in claim 9, wherein said second portion (31; 32) is located alongside said pipe (7).

12. A canister assembly as claimed in claim 7, wherein said canister assembly defines a volume (V) for the sealing fluid; and in that said connecting unit (25) is below said volume (V) in said assembly direction (A).

* * * * *